Patented Jan. 23, 1940

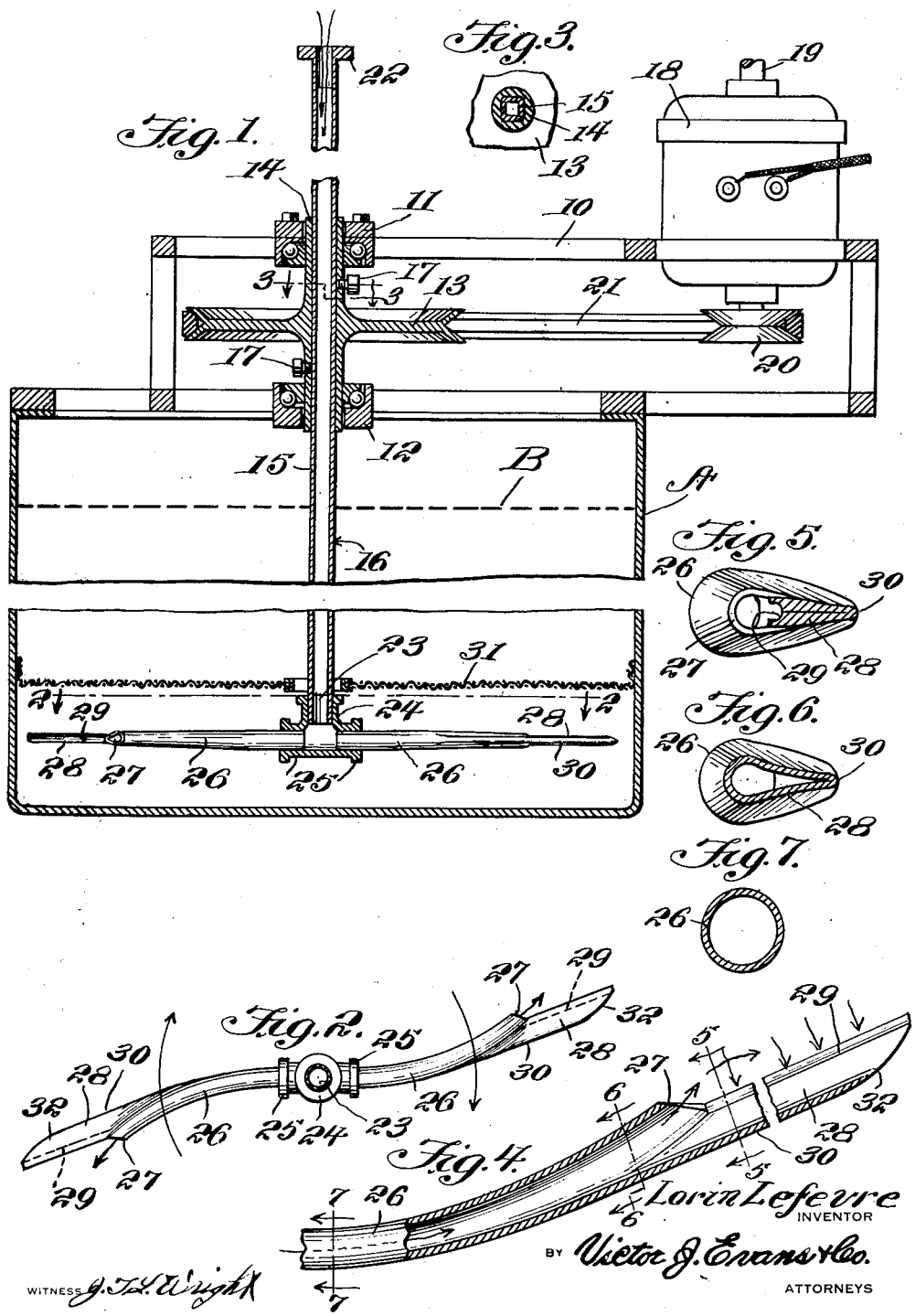

2,187,746

UNITED STATES PATENT OFFICE 2,187,746

MACHINE FOR AERATING WATER

Lorin Lefevre, Great Falls, Mont.

Application April 25, 1938, Serial No. 204,170

1 Claim. (Cl. 261—87)

The invention relates to an aerating device and more especially to a machine for aerating water.

The primary object of the invention is the provision of a machine of this character, wherein a body of water as may be contained in a tank, pond or otherwise held can be purified or supplied with oxygen with a view of avoiding stagnation and thus making it possible to sustain fish life therein particularly during the transportation of live fish or for the purification of the water when stored for its use for drinking purposes.

Another object of the invention is the provision of a machine of this character, wherein the same is susceptible of adjustment for operation within bodies of water of different depths and also is susceptible of operation without liability of disturbing fish within the water or injuring the same during the working of the machine and in the working of such machine the water will be aerated to avoid stagnation or the same becoming stale and thus assuring purification thereto through the supply of oxygen thereto.

A further object of the invention is the provision of a machine of this character, wherein air can be introduced into the water without excessive agitation thereof or producing water current of sufficient force to injure living creatures therein, the machine being of novel construction and in the operation thereof will completely aerate the water, either for sustaining life and health to fish contained therein or for purification of such water when stored for drinking purposes.

A still further object of the invention is the provision of a machine of this character, which is simple in its construction, thoroughly reliable and efficient in operation, assuring the aerating of water without consumption of excessive power, readily and easily adjusted, and inexpensive to manufacture and install.

With these and other objects in view, the invention consists in the features of construction, combination and arrangement of parts as will be hereinafter more fully described, illustrated in the accompanying drawing, which discloses the preferred embodiment of the invention and pointed out in the claims hereunto appended.

In the accompanying drawing:

Figure 1 is a vertical sectional view through a water tank showing the machine constructed in accordance with the invention applied thereto.

Figure 2 is a sectional view taken on the line 2—2 of Figure 1 looking in the direction of the arrows.

Figure 3 is a sectional view on the line 3—3 of Figure 1 looking in the direction of the arrows.

Figure 4 is a fragmentary top plan view of one arm of the rotary air distributor and being partly in section.

Figure 5 is an enlarged sectional view taken on the line 5—5 of Figure 4 looking in the direction of the arrows.

Figure 6 is a sectional view on the line 6—6 of Figure 4 looking in the direction of the arrows.

Figure 7 is a sectional view on the line 7—7 of Figure 4 looking in the direction of the arrows.

Similar reference characters indicate corresponding parts throughout the several views in the drawing.

Referring to the drawing in detail, A designates generally a portion of a water tank and the same may be of any capacity for the holding of a body of water, its level being indicated at B. This tank A at its open upper end or top has arranged in proper position for operation the aerating machine constituting the present invention and hereinafter fully described.

The aerating machine comprises a horizontally disposed frame 10 which is adapted to be stationarily supported at the open top of the tank A to extend a distance transversely thereto and within this frame are built vertically aligned bearings 11 and 12, respectively, these being of the ball bearing type and are susceptible of detachment from the frame, either one or both of the same. On attachment of the bearings 11 and 12 to the frame, they are fixed in their vertical alignment with each other, the bearing 11 being vertically spaced upwardly from the bearing 12 and rotatably fitting the said bearings is a pulley wheel 13, its hub 14 having square fitting with the squared portion 15 of a vertically adjustable air supply pipe 16, the hub 14 being provided with set screws 17 engageable with the squared portion 15 of said pipe 16 so that the pulley 13 is adjustably secured to the pipe. In other words, the pipe 16 is susceptible of adjustment vertically in the hub 14 of the pulley 13 without disturbing the latter in its fitting with the bearings 11 and 12, the purpose of the vertical adjustment of the pipe 16 being hereinafter set forth.

Carried in the frame 10 is an electric power unit, such as an electric motor 18, although any other type of motive power may be employed, its power shaft 19 being vertically disposed and is fitted with a pulley 20 having trained thereover an endless belt 21, the same being trained over the pulley 13 so that when the motor is in operation power therefrom will be transferred to the pulley 13 for the driving of the same and in turn the pipe 16 is rotated therewith.

The pipe 16 at its upper end 22 merely extends into the open air and the centrifugal force generated by the rigidly revolving arms 26 causes the water to be expelled and air naturally replaces such water so that there is no need for an external mechanical supply of air through this pipe 16. The lower end 23 of this pipe 16 is constructed for the connection of an inverted T-union 24 therewith and this union at the opposite horizontally extended branches 25 has connected thereto opposed air discharge tubular arms 26, these being curved reversely to each other with the curvature arching in the direction of the lead side of each arm 26. The arms 26 have the reversely beveled outer open ends 27 for the discharge of air therefrom admitted thereto from the pipe 16. These arms 26 have formed thereon at the ends 27 outwardly extending blade formations 28 which have their top and bottom surfaces tapered in the direction of the lead side of the said arms 26 for effecting knife edge-like bladed tips to the said arms while at the heel or trailing edges of these blades 28 therein formed are troughing channels or grooves 29 for air streams issuing from the ends 27 of the arms 26 and these channels or grooves on the rotary sweep of said arms through the rotation of the pipe 16 within a body of water effect a partial suction action at the trailing sides of the arms 26 in confronting relation to the discharge ends 27 thereof while the lead edges 30 of the blades or tips 28 effect a cutting or splitting action upon the body of water during the rotary swing of the said arms within the body of water and this resulting in the drawing of air from the pipe 16 through the arms 26 and the discharge of said air into the body of water in a direction toward the trailing edges of the tips or blades 28 so that the air will be delivered into the body of water in the direction of the path of movement of the arms 26 and broken into minute bubbles resultant from the friction of the water against the air pocketed behind the trailing edges of the blades and thus in this manner completely oxygenating the water without creating excessive current therein, the knife-like edges of the blades or tips 28 assure the passage thereof within the body of water with ease and thus minimizing the consumption of power in the operation of the machine.

The adjustment of the pipe 16 with relation to the pulley 13 allows the placing of the arms 26, which, with the union 24, produces a rotary air distributor close to the lowermost point within the body of water contained within the tank A when such tank is of a determined size and thus the machine is adaptable to tanks or other water containers of varying sizes with respect to the depth of the water therein.

Placed within the tank A is a foraminous guard 31, which is fixed in a horizontal plane elevated with respect to the path of rotation of the distributor involving the union 24 and arms 26 together with the blades or tips 28 so that this distributor can not possibly disturb or cause injury to live creatures within the body of water within said tank A above the guard 31. In other words, fish held within the tank A and swimming within the body of water can not pass into the path of rotation of the distributor of the machine as the guard 31 will constitute a barrier to the fish from gaining access to the lower portion of the tank A and coming into contact with said distributor of the machine.

The knife-like edge 30 approaches the outer extremity of each blade or tip 28 on a curve as at 32 giving a rounded formation thereto.

What is claimed is:

An apparatus of the kind described comprising a water container, a tubular rotatable air supply means extended into the container, open end oppositely disposed tubular air distributing arms fitted with said means, being reversely curved to each other in a horizontal plane and arched toward the lead side of each arm, and knife edged blades forming continuations of the arms at their open ends and meeting the curvature of said arms tangentially on the lead sides thereof and having grooves in the heel edges merging with the open ends of said arms for partial suction action at the said heel edges.

LORIN LEFEVRE.